United States Patent
Frederick et al.

(10) Patent No.: US 9,707,888 B1
(45) Date of Patent: Jul. 18, 2017

(54) REMOVABLE CARGO LINER HAVING SELECTIVE ILLUMINATION CAPABILITY

(71) Applicant: Toyota Motor Engineering & Manufacturing North America, Inc., Erlanger, KY (US)

(72) Inventors: Scott L. Frederick, Brighton, MI (US); Ryan C. Harris, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/257,453

(22) Filed: Sep. 6, 2016

(51) Int. Cl.
| | | |
|---|---|---|
| *B60Q 1/14* | (2006.01) | |
| *B60Q 3/06* | (2006.01) | |
| *H05B 37/02* | (2006.01) | |
| *F21S 9/03* | (2006.01) | |
| *H02S 30/20* | (2014.01) | |
| *H02J 7/35* | (2006.01) | |
| *H02J 7/14* | (2006.01) | |

(52) U.S. Cl.
CPC ............... *B60Q 3/06* (2013.01); *F21S 9/035* (2013.01); *H02J 7/1423* (2013.01); *H02J 7/355* (2013.01); *H02S 30/20* (2014.12); *H05B 37/0272* (2013.01); *B60Q 2900/30* (2013.01)

(58) Field of Classification Search
CPC .................................. B60R 9/06; B60R 9/065
USPC .................................... 362/496, 487; 315/77
See application file for complete search history.

(56) References Cited

U.S. PATENT DOCUMENTS

| | | | | |
|---|---|---|---|---|
| 5,137,322 A | * | 8/1992 | Muirhead | B60R 13/01 296/39.2 |
| 5,221,119 A | * | 6/1993 | Emery | B60R 13/01 220/495.01 |
| 5,573,327 A | * | 11/1996 | Dealey, Jr. | B60Q 3/30 362/328 |
| 6,000,821 A | | 12/1999 | Beliakoff | |
| 6,238,068 B1 | * | 5/2001 | Farmer, Jr. | B60Q 3/30 362/230 |
| 7,134,773 B2 | | 11/2006 | Tufte | |

(Continued)

OTHER PUBLICATIONS

Go Power!, "RV and Marine Solar Power Solutions", Received from the Internet: <http://gpelectric.com/applications/rv-marine-power>, Received Jul. 18, 2016, 2 pages.

(Continued)

*Primary Examiner* — Thuy Vinh Tran
(74) *Attorney, Agent, or Firm* — Christopher G. Darrow; Darrow Mustafa PC

(57) ABSTRACT

A removable cargo liner for selectively illuminating a vehicle rear cargo area is disclosed. The removable cargo liner may include a planar body portion, a light element assembly, and a photovoltaic cell circuit. The light element assembly provides selective illumination, and is in a fixed relation with the planar body portion. The photovoltaic cell circuit being received by the planar body portion, wherein the photovoltaic cell circuit is oriented to receive light energy and to produce therefrom a photovoltaic charge signal. The photovoltaic cell circuit includes a controller coupled to the charging circuit and to the light element assembly. The controller is operable in a first mode for charging the voltage source and in a second mode for discharging the voltage source to the light element assembly.

20 Claims, 4 Drawing Sheets

(56) References Cited

U.S. PATENT DOCUMENTS

| | | | | |
|---|---|---|---|---|
| 8,282,254 | B2* | 10/2012 | Sautter | ............... B60R 9/055 |
| | | | | 362/154 |
| 2016/0288719 | A1* | 10/2016 | Sterling | ............... B60R 5/04 |
| 2016/0288725 | A1* | 10/2016 | Sterling | ............ B60N 3/101 |
| 2016/0288727 | A1* | 10/2016 | Sterling | ............ B60R 9/065 |

OTHER PUBLICATIONS

Dodge RAM Forum, "Truck Bed Lightings (Solar?)", Received from the Internet: <http://www.ramforumz.com/archive/index.php/t-150804.html>, Received Jul. 15, 2016, 2 pages.

\* cited by examiner

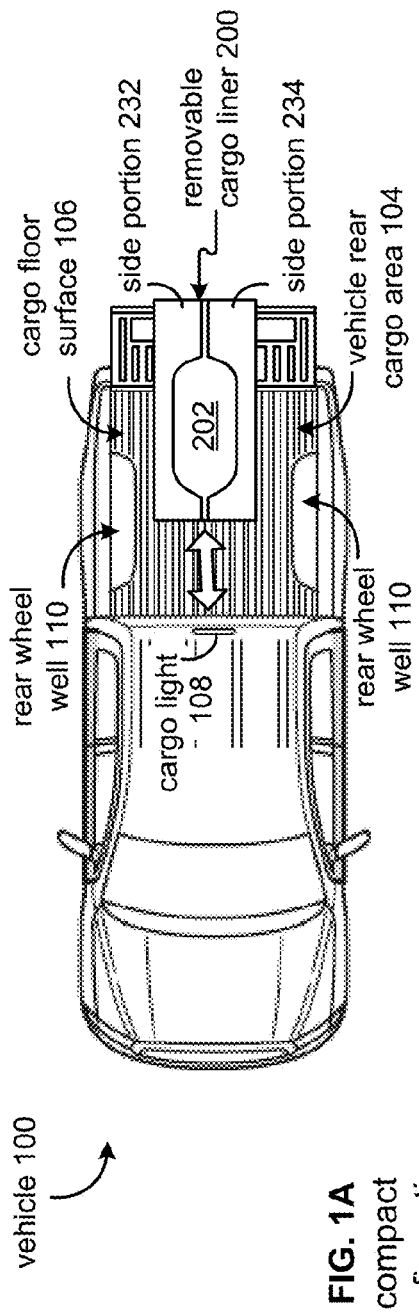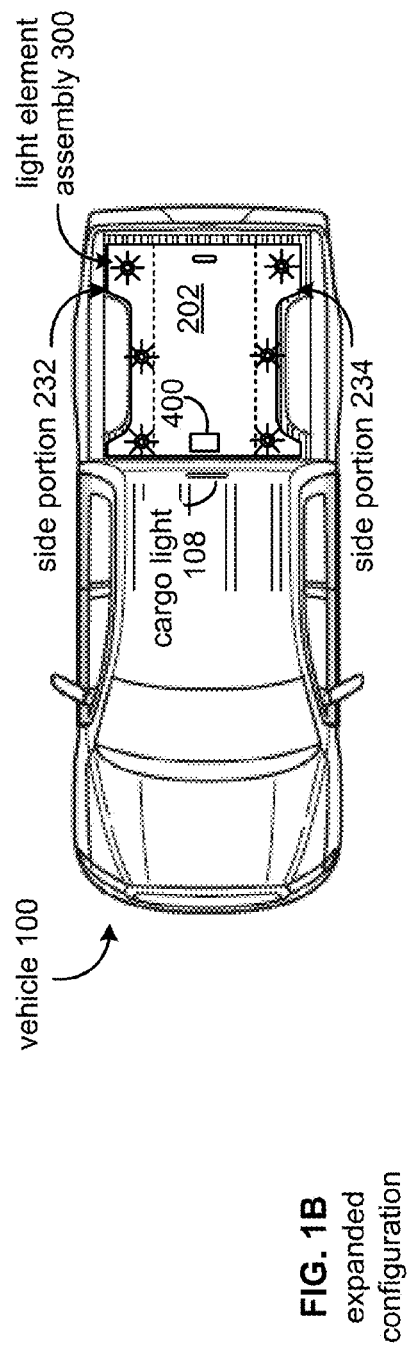
FIG. 1A
compact configuration
FIG. 1B
expanded configuration

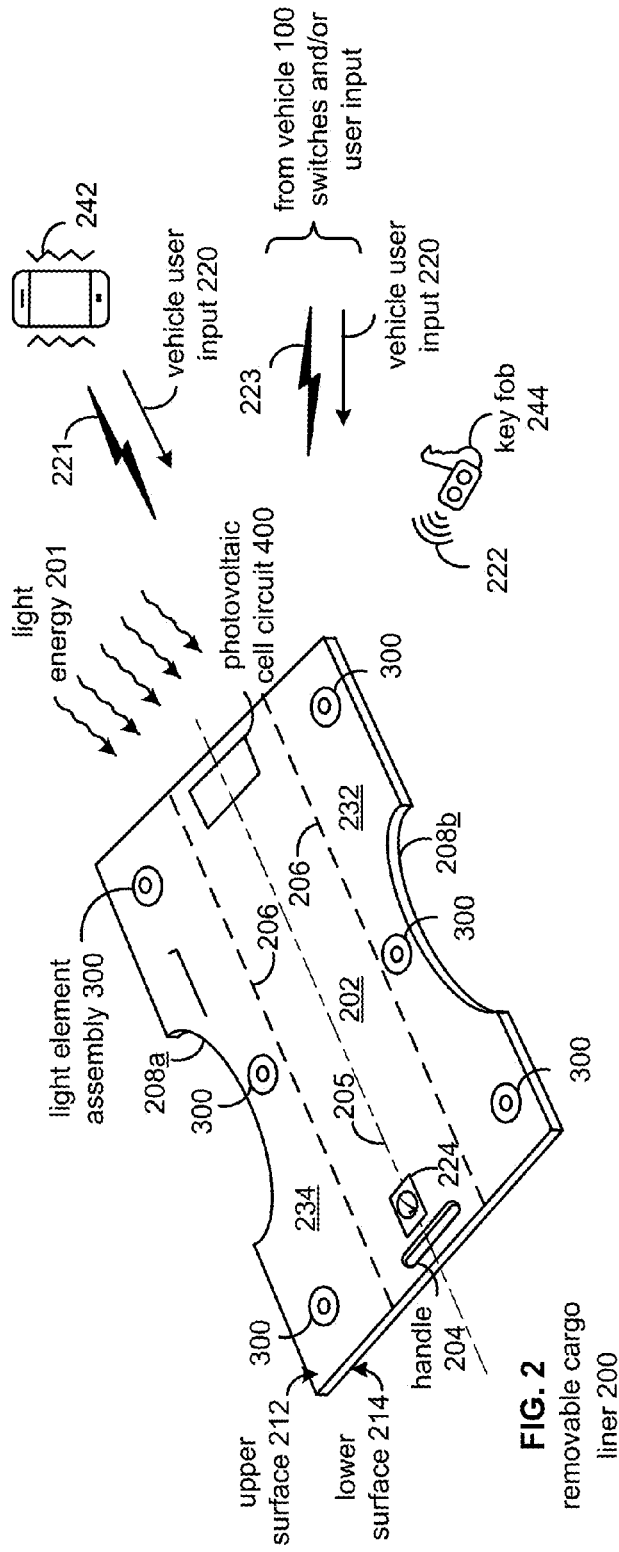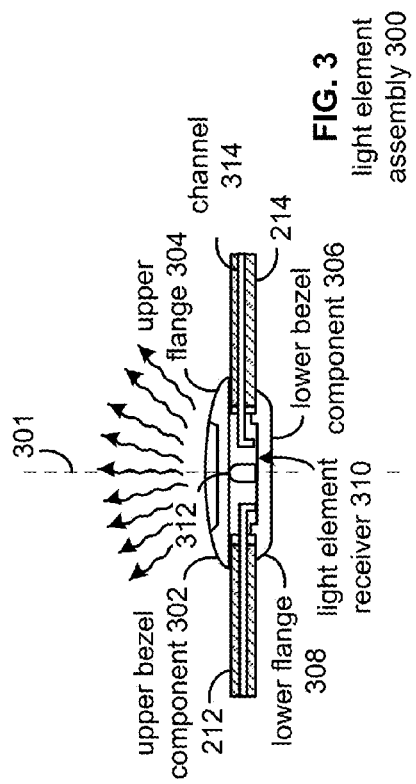

photovoltaic cell circuit 400

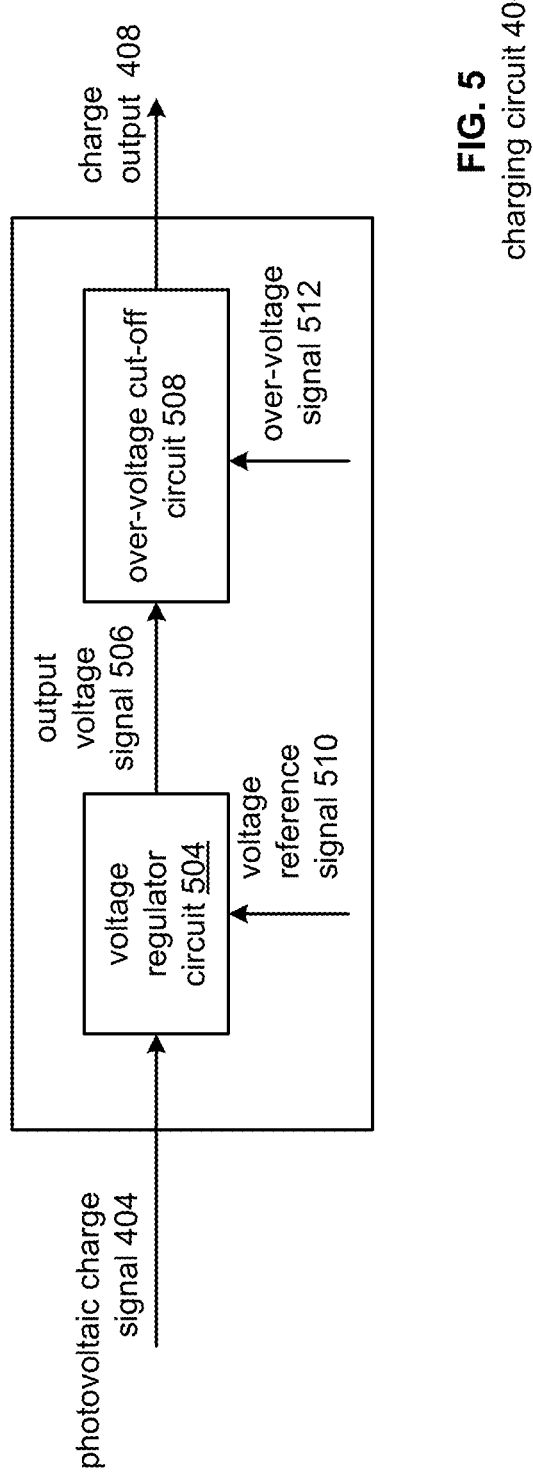

REMOVABLE CARGO LINER HAVING SELECTIVE ILLUMINATION CAPABILITY

BACKGROUND

Vehicle rear cargo areas, such as truck beds, generally lack lighting to aid vehicle users to retrieve and/or arrange items in poor lighting conditions. Though some vehicles may have high-mounted cargo lamps, they are not exceedingly bright due to the backwards facing direction towards following vehicles, and are set near the vehicle roofline to shine down, creating shadows, and further difficulties in seeing the cargo area. Adding vehicle lighting to a cargo area has been cumbersome because an owner has been called on to splice into existing wiring harness, sometimes on a best guess operation, or relegated to using movable disposable-battery-powered light modules that may lack meaningful battery life, such that when switched on in a night time or low-light condition, will be unreliable to illuminate portions of the cargo area. It is desirable that rear cargo area lighting be self-contained, self-sustaining, and provide lighting from the floor surface that is also easily removable for use with other vehicles and/or uses.

SUMMARY

A device for a removable cargo liner for selectively illuminating a vehicle cargo area is disclosed.

In one implementation, a removable cargo liner for selectively illuminating a vehicle rear cargo area is disclosed. The removable cargo liner may include a planar body portion, a light element assembly, and a photovoltaic cell circuit. The removable cargo liner includes the planar body portion having a surface area adapted to cover at least a portion of a cargo floor surface when removably positioned in the vehicle rear cargo area. The light element assembly provides selective illumination, and is in a fixed relation with the planar body portion. The photovoltaic cell circuit being received by the planar body portion, wherein the photovoltaic cell circuit being oriented to receive light energy and to produce therefrom a photovoltaic charge signal. The photovoltaic cell circuit includes a charging circuit for charging a voltage source, the charging circuit coupled to the photovoltaic cell circuit and operable to receive the photovoltaic charge signal to produce a charge output. The photovoltaic cell circuit also includes a controller coupled to the charging circuit and to the light element assembly. The controller is operable in a first mode for charging the voltage source and in a second mode for discharging the voltage source to the light element assembly.

In another implementation, a cargo liner having a compact configuration and an expanded configuration is disclosed. The removable cargo liner may include a planar body portion, a light element assembly, and a photovoltaic cell circuit. The removable cargo liner includes the planar body portion having a surface area adapted to cover at least a portion of a cargo floor surface when removably positioned in the vehicle rear cargo area. The light element assembly provides selective illumination, and is in a fixed relation with the planar body portion. The photovoltaic cell circuit being received by the planar body portion, wherein the photovoltaic cell circuit being oriented to receive light energy and to produce therefrom a photovoltaic charge signal. The photovoltaic cell circuit includes a charging circuit for charging a voltage source, the charging circuit coupled to the photovoltaic cell circuit and operable to receive the photovoltaic charge signal to produce a charge output. The photovoltaic cell circuit also includes a controller coupled to the charging circuit and to the light element assembly, wherein when in the expanded configuration, the controller being operable in a first mode for charging the voltage source and in a second mode for discharging the voltage source to the plurality of light element assemblies; and when in the compact configuration, the controller being operable in an override mode to disregard vehicle user input.

In another implementation, a renewable-energy device for controlling illumination of a cargo liner is disclosed. The renewable-energy device includes a photovoltaic cell circuit received by a body portion of the cargo liner. The photovoltaic cell circuit has a plurality of solar cells, a charging circuit, and a controller. The plurality of solar cells are operable to receive light energy and produce therefrom a photovoltaic charge signal. The charging circuit is operable to charge a voltage source, the charging circuit coupled to the plurality of solar cells to receive the photovoltaic charge signal and to produce a charge output. The controller is coupled to the charging circuit and to the light element assembly, wherein the controller is operable in a first mode for charging the voltage source and in a second mode for discharging the voltage source to a light element assembly to provide illumination.

BRIEF DESCRIPTION OF THE DRAWINGS

The description makes reference to the accompanying drawings wherein like reference numerals refer to like parts throughout the several views, and wherein:

FIGS. 1A and 1B show a top view of a schematic representation of a vehicle including a removable cargo liner in a compact configuration and an expanded configuration, respectively;

FIG. 2 shows an illustration of a perspective view of the removable cargo liner in an expanded configuration of FIG. 1B;

FIG. 3 shows a sectioned view of a light element assembly of FIG. 2;

FIG. 5 shows a block diagram of the charging circuit of the photovoltaic cell circuit of FIG. 4.

DETAILED DESCRIPTION

Figure 4:
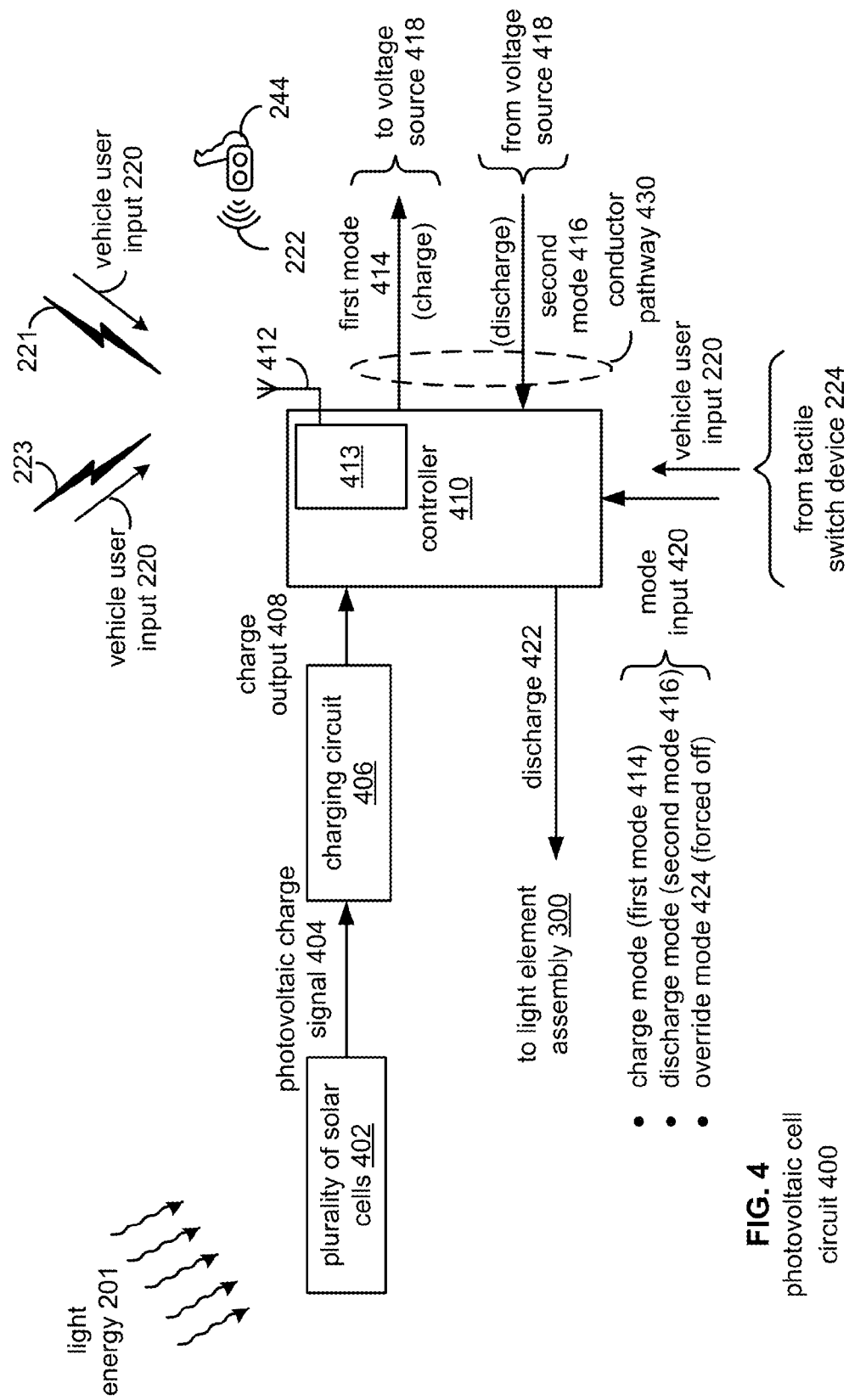
FIG. 4 shows a block diagram of a photovoltaic cell circuit of FIG. 2.

A device for a removable cargo liner having a light element assembly for providing selective illumination for a vehicle rear cargo area is disclosed.

The removable cargo liner, described in detail herein, includes a planar body portion with a surface area adapted to cover at least a portion of a cargo floor surface of a vehicle rear cargo area. The removable cargo liner includes a compact configuration to facilitate placement in the vehicle rear cargo area, and storage when not in use. The removable cargo liner includes an expanded configuration, in which the surface area is adapted to cover at least a portion of the cargo floor surface of the vehicle rear cargo area.

When in the expanded configuration, a light element assembly is operable to provide selective illumination to the vehicle rear cargo area. A photovoltaic cell circuit of the removable cargo liner is oriented to receive light energy and to produce a photovoltaic charge signal. The photovoltaic cell circuit is operable in a first mode to charge a voltage source, such as a battery and/or battery pack, and in a second mode, discharge the voltage source to the light element assembly.

As may be appreciated, the light element assembly of the removable cargo liner provides selective illumination originating upwards from the cargo liner, and in directions and intensities based on a bezel of the light element assembly.

For illumination in the second mode, the removable cargo liner may receive a vehicle user input via the photovoltaic cell circuit, such as via wireless communication via a handheld mobile device, a wireless communication via the vehicle control panels (such as when a traditional cargo light switch is activated), a near field communication (NFC) fob, a tactile switch of the cargo liner, etc.

Referring to FIGS. 1A and 1B, illustrate a top view of a schematic representation of a vehicle 100 including a removable cargo liner 200 in a compact configuration, and in an expanded configuration, respectively. The vehicle 100 includes a vehicle rear cargo area 104, a cargo floor surface 106, and a high-mounted cargo light 108.

The vehicle rear cargo area 104 serves to provide storage and/or transport capability for the vehicle 100. In the example provided, the vehicle 100 is shown as a pickup truck. As may be appreciated, the vehicle 100 may be provided as other vehicles that include a vehicle rear cargo area 104, such as a sports utility vehicle, whether a small, medium, or large sized sports utility vehicle, a station wagon vehicle, a hatch-back vehicle, a vehicle with a rear double-door access, a vehicle with a rear tailgate-type access, a vehicle with a rear swing-out door access, etc.

The high-mounted cargo light 108 may be activated by a vehicle user in the passenger portion of the vehicle 100 by depressing a switch designated for that use. Generally, a high-mounted cargo lamp may not be sufficiently bright for viewing the contents of the vehicle rear cargo area 104.

For example, when illuminated, light from the high-mounted cargo light 108 faces to the rear of the vehicle 100, but also may be directed towards following vehicles (or approaching vehicles from behind, such as when at a roadside, etc.), and affecting other driver vision. Also, the high-mounted cargo light 108 may shine down on the vehicle rear cargo area 104, creating shadows and having severe attenuation past a certain distance. A person in the cargo area 104 may also inadvertently and intermittently block the light element of the cargo light 108. As a result, cumulative glare and/or shadows may create difficulties for an individual to the cargo area contents, and effectively complete rearranging and/or loading the rear cargo area 104.

The removable cargo liner 200 includes a planar body portion 202. The planar body portion 202 includes a side portions 232 and 234. In the example of FIG. 1A, side portions 232 and 234 are folded against the planar body portion 202 to minimize the surface area and/or footprint of the removable cargo liner 200. In this manner, the removable cargo liner 200 may be slid or placed in position while ionizing obstructions.

In the example of FIG. 1A, possible obstructions may be the rear wheel wells 110, in other vehicles, it may be a spare tire side well, etc. Also, the compact configuration provides easier storage and/or transport of the cargo liner 200 when not in use.

The cargo liner 200 is made of a material having sufficient rigidity and durability to hold-up to cargo loads, while also sufficiently light weight so that a single individual may place and/or remove the cargo liner 200 in relation to the vehicle rear cargo area 104. Composite material layers may be employed, such as a sandwiched flexible layer, with relatively harder outer surfaces, as well as singular layers of durable materials. For example, suitable materials may include Acrylonitrile Butadiene Styrene (ABS) plastics, polymer materials, composite fiber materials, and variations thereof. Also, depending on the rigidity of the material used, the removable cargo liner 200 may be rolled for providing a compact configuration, as well as be provided by a plurality of panels being stackable (either individually or as interconnected unit) to provide a smaller footprint when in a compact configuration such as that of FIG. 1A.

Referring to FIG. 1B, shown is a schematic illustration a vehicle 100 including a removable cargo liner 200 in an expanded configuration. The side portions 232 and 234 and the planar body portion 202 provide a surface area adapted to cover at least a portion of the cargo floor surface 106. In the expanded configuration, the light element assembly 300 is exposed to provide selectively illumination of the vehicle rear cargo area 104. The light element assembly 300 is in a fixed relation with planar body portion 202. As may be appreciated, the light element assembly 300, alone or in combination with the cargo light 108, may provide selective illumination to the vehicle rear cargo area 104. Also, a number of light element assemblies 300 may be provided in spaced-apart, fixed relation with the planar body portion to provide increased selective illumination to the vehicle near cargo area 104.

As may be also appreciated, the light element assembly 300 may be positioned at a periphery with respect to the planar body portion 202. Generally, smaller vehicle loads, such as items on pallets, or larger items, may be placed on the planar body portion 202, because that is where they are readily received by the vehicle rear cargo area 104. Having the light element assembly 300 at a periphery in relation thereto, selective illumination is provided at regions that may not be otherwise sufficiently illuminated by the cargo light 108 (that is, to the sides of the vehicle 100), as well as to regions of the vehicle rear cargo area 104 near the back end of the vehicle 100. Also, tall cargo loads (for example, a refrigerator, freezer, etc.), may block light from the cargo light 108.

The removable cargo liner 200 includes a photovoltaic cell circuit 400, which is in selective electrical communication with the light element assembly 300, and with a voltage source. In the example of FIG. 1B, the circuit 400 is generally centered about a midline of the removable cargo liner 200, towards a cab, or passenger section, of the vehicle 100. In this manner, the photovoltaic cell circuit 400 may be sufficiently exposed to receive light energy during the daytime by natural light (or during low-light conditions such as night-time by artificial lights, such as street lights, city lighting, etc.). The photovoltaic cell circuit 400 may then produce therefrom a photovoltaic charge signal.

The photovoltaic charge circuit 400 operates in a first mode and a second mode. In the first mode, the photovoltaic charge signal is operable to charge a voltage source, such as a rechargeable battery and/or a battery bank. In the second mode, the voltage source is operable to be discharged to the light element assembly 300. In this manner, the removable cargo liner 200 may provide an independent, rechargeable light source without relying upon a vehicle power source (such as via a vehicle battery), and without a need to physically connect to the electrical conduits of the vehicle 100. Moreover, the photovoltaic charge circuit 400 provides portability to the removable cargo liner 200. For example, the liner 200 may be moved to other vehicles (having similar configurations to accept the liner 200), may be used outside the vehicle 100, etc.

Also, in a compact configuration such as that of FIG. 1A, an override mode may be applied to avoid inadvertent discharge of the voltage source. For example, an errant vehicle user input 224 (such as, for example, a key fob device 244) may pass proximate to activate the light element assembly 300. When in a compact configuration, the override mode would disregard a discharge mode input, and instead would override operation of circuit 400 to avoid inadvertent discharge of the voltage source of the removable cargo liner 200. As an example, magnetic switches, proximity switches, etc. may be disposed on opposing folds of the removable cargo liner 200 to generate an electronic signal indicating the compact configuration by "closing the loop," and initiate an override mode.

The key fob device 244 may also be part of a smart key system that permits a user to carry an electronic key, such as in their pocket, to activate vehicle components. For example, a smart key system may operate to lock and unlock side doors, start the vehicle engine, and lock and unlock a vehicle backdoor, when present. Further, the removable cargo liner 200 may learn to recognize a fob 244 of a smart key system, and provide a charge or first mode and a discharge or second mode of operation for the photovoltaic cell circuit 400 to selectively illuminate 300 the plurality of light element assemblies.

The photovoltaic cell circuit 400 is discussed in detail herein with respect to FIGS. 2-5.

FIG. 2 is an illustration of a perspective view of the removable cargo liner 200 in an expanded configuration. The removable cargo liner 200 includes a planar body portion 202 having a surface area adapted to cover at least a portion of the cargo floor surface 106 (see FIG. 1A). The side portions 232 and 234 are deployed to cover a further portion of the cargo floor surface 106 along seam and/or hinge 206. The seam and/or hinge 206 are generally aligned with a center axis-of-symmetry 205 of the planar body portion 202 to define the side portions 232 and 234, and to permit the side portions 232 and 234 to fold against the planar body portion 202 for placing the liner 200 in a compact configuration.

The seam and/or hinge 206 may be a perforated line to reduce rigidity, a hinge with center pin construction, etc. As may be appreciated, the seam may also be formed by corresponding tapered portions of the respective portions to also facilitate folding against the planar body portion 202.

As may also be appreciated, other embodiments may provide a singular seam and/or hinge 206 oriented about a center axis-of-symmetry 205, and further, may be oriented offset from the center axis-of-symmetry 205. In this manner, a compact configuration may be achieved, but not to the extent as that of FIG. 1A. A consideration for the level of compactness may be the average user, and their ability to maneuver a removable cargo liner 200 without undue hardship.

The removable cargo liner 200 includes an upper surface 212 and a lower surface 214. The upper surface 212 provides a fixed relation of the light element assembly and/or assemblies 300 with the planar body portion 202. As may be appreciated, the light element assembly and/or assemblies 300 may be positioned at a periphery with respect to the planar body portion 202.

Generally, smaller vehicle loads, such as items on pallets, or larger items, may be placed on the planar body portion 202, because that is where they are readily received by the vehicle rear cargo area 104 (see FIGS. 1A and 1B). Positioning the light element assembly and/or assemblies 300 at a periphery in relation thereto provides selective illumination to cargo area regions that may not be otherwise sufficiently illuminated by the cargo light 108 (that is, to the sides of the vehicle 100), as well as to regions of the vehicle rear cargo area 104 near the back end of the vehicle 100 (see FIGS. 1A and 1B). Also, tall cargo loads (for example, a refrigerator, freezer, etc.), may block light from the cargo light 108.

The photovoltaic cell circuit 400 receives light energy 201, and produces therefrom a charge output to charge a voltage source, such as a battery and/or battery bank. The photovoltaic cell circuit 400 is operably coupled to the light element assemblies 300 in series, in parallel, or in a combination thereof to maximize the rechargeable voltage source of the cell circuit 400 when discharged based on vehicle user input 220, in which the photovoltaic cell circuit 400 is also communicatively coupled to receive vehicle user input 220.

In the example of FIG. 2, the vehicle user input 220 may be provided to the photovoltaic cell circuit 400 by tactile input switch data from the tactile input switch 224, by wireless input data via a communication link 221 formed with handheld mobile device 242, by near field communication input data by near field communication link 222 of a key fob 244, etc.

A handle 204 is formed through the planar body portion 202 for aiding in removal and/or placement of the removable cargo liner 200. As may be appreciated, other variations of handle 204 may be implemented, such as a partial through handle structure, a pop-up handle structure, a raised ridge handle structure, etc.

Referring to FIG. 3, shown is a sectioned view of a light element assembly 300. The light element assembly 300 may include an upper bezel component 302 and a lower bezel component 306. As may be appreciated, the removable cargo liner 200 may be made of a durable and fluid resistant material, which may also have transparent and/or translucent characteristics about a light element assembly 300. The upper and lower bezel component 302 and 306 may include transparent material, semi-transparent materials, or a combination thereof, to illuminate an upper surface 212 and/or a lower surface 214 of the removable cargo liner 200, respectively.

For example, an outer periphery of a bezel 302 and/or 306 may be semi-transparent, while a center portion aligned along a center axis 301 may be substantially transparent to a light element 312, and further patterned to provide a diffusion light pattern to the exterior of the light element assembly 300. As a further example, the outer periphery of the bezel 302 and/or 306 may be transparent, and further include a diffraction pattern to provide a diffusion light pattern about the exterior periphery of the light element assembly 300, while a center portion being aligned along the center axis 301 may be substantially transparent to the light element 312 to avoid direct light into a vehicle users eyes when looking downward.

The upper bezel component 302 includes an upper flange 304. The lower bezel component 306 includes a lower flange 308. The upper flange 304 and the lower flange 308 cooperate to receive the upper surface 212 and the lower surface 214, respectively, to secure a respective light element assembly 300 with the removable cargo liner 200. The upper and lower bezel components 302 and 304 may be a snap construction to lock and/or fix the components together to protect the interior, and components such as electrical couplings carried by a channel 314 defined by the portion 202, 232, and 234, light element receiver 310, and light element 312, from the environment (such as dust, moisture, etc). Also, the components may be coupled together by fasteners, such as a screw, bolt, pin, etc.

The light element 312 may include a light emitting diode (LED) light element, a red-green-blue (RGB) LED light element, a high intensity discharge (HID) light element, an incandescent light element, etc.

FIG. 4 shows a block diagram of the photovoltaic cell circuit 400. The photovoltaic cell circuit 400 may include a plurality of solar cells 402, a charging circuit 406, and a controller 410, to provide a renewable-energy illumination device for a cargo liner 200.

The plurality of solar cells 402 operate to receive light energy 201, and produce therefrom a photovoltaic charge signal 404. The solar cells 402 may be oriented to form a planar surface for receiving the light energy 201 and may be coupled together to generate an additive voltage to produce the photovoltaic charge signal 404.

The charging circuit 406, for charging the voltage source 418, receives the photovoltaic charge signal 404 and produces a charge output 408. The charging circuit 406 includes circuitry to regulate a charging voltage of the charge output 408, and an over-voltage cut-off circuit, which is discussed in detail with reference to FIG. 5.

The controller 410, when in a first mode 414, operates to charge a voltage source 418. When in a second mode 416, the controller 410 operates to receive a discharge from the voltage source 418, and produce a discharge signal 422 to the light element assembly 300, or a plurality of light element assemblies 300.

In this manner, based on the mode 420 input to the controller 410, the photovoltaic cell circuit 400 provides a self-sustaining, rechargeable, voltage source to provide selective illumination by the light element assembly 300. The removable cargo liner 200 does not require splicing into a power harness of a vehicle 100 to operate.

The controller 410 may include a multiplexer (MUX) device, a switch device, etc., which may operate to couple either of the charge output 408 or the discharge signal 422 with the voltage source 418, via conductor 430. As may be appreciated, and by way of the example, the control 410 coupling with the voltage source 418 are shown as two modes (charge/discharge). As may be appreciated, the two modes may be coupled internally over a conductor 430, with a terminal of the voltage source 418 operably coupled to a common ground.

Also, the input mode 420 may be implemented on a wired and/or wireless basis. For example, the tactile input switch 224 may provide a vehicle user input 220 in the form of tactile input switch data. Also, the vehicle user input 220 may be based on wireless communications 223 from a vehicle wireless communication of the vehicle 100 (such as from a user input to activate a high-mounted cargo light 108 (see FIGS. 1A and 1B)), by a wireless communication 221 of a handheld mobile device, such as a via an installed application to input the mode 420 input to turn on and/or illuminate the light element assembly 300, by a near field communication (NFC) 222 by a key fob 244 for hands-free activation and/or deactivation when a user is in proximity to the photovoltaic cell circuit 400.

When the removable cargo liner 200 is in a compact configuration (see FIG. 1A), an override mode 424 may be applied by default (or overtly by a user) to avoid inadvertent discharge of the voltage source 418. For example, an errant vehicle user input 224 (such as, for example, the key fob device 244 in a near field communication system and/or a smart key system) may pass close to activate the light element assembly 300, and place the circuit 400 in a discharge and/or second mode 416. When in a compact configuration, the override mode would disregard a dis- charge mode input, and instead would override operation of circuit 400 to avoid inadvertent discharge of the voltage source of the removable cargo liner 200. As an example, magnetic switches, proximity switches, etc. may be disposed on opposing folds of the removable cargo liner 200 to generate an electronic signal indicating the compact configuration by "closing the loop," and initiate an override mode.

As a further example of near field communication systems, a smart key system may permit a user to carry an electronic key, such as in their pocket to activate vehicle components. Generally, vehicle component activation may include locking and unlocking side doors, starting the vehicle engine, and locking and unlocking a vehicle backdoor, when present. Further, the removable cargo liner 200 may learn to recognize the smart key system, and provide an operational mode control for the controller 410 to discharge the voltage source 418 to the plurality of light element assemblies in discharge signal 422 to illuminate, and return to the first mode 414 to a charge state for the voltage source 418.

The controller 410 may further include a wireless communication interface 213 communicatively coupled to an antenna 413. The antenna 413 operates to provide wireless communications with the photovoltaic cell circuit 400, including wireless communications 221, 223, and/or 222.

Such wireless communications may range from national and/or international cellular telephone systems to the Internet to point-to-point in-home wireless networks to radio frequency identification (RFID) systems and near field communication (NFC) systems. Each type of communication system may be constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

FIG. 5 illustrates a block diagram of the charging circuit 406. The charging circuit 406 may include a voltage regulator circuit 504 and an over-voltage cut-off circuit 508.

The voltage regulator circuit 504 receives the photovoltaic charge signal 404 and produces an output voltage signal 506 based on a voltage reference signal 510. The voltage reference signal 510 operates to place the output voltage signal 506 to within an operational range for charging the voltage source 418 (see, e.g., FIG. 4). The over-voltage cut-off circuit 508 receives the output voltage signal 506 and produces the charge output 408. The over-voltage signal 512 provides feedback to the circuit 508 of the charge state for the voltage source 418. In other words, when the voltage source 418 is full, or charged, the over-voltage cut-off circuit 508 stops the charge output 408 by the charging circuit 406.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" may be used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus, as well as several embodiments including a preferred embodiment, for implementing a removable cargo liner for selectively illuminating a vehicle rear cargo area.

It will be apparent to those skilled in the art that the disclosed invention may be modified in numerous ways and may assume many embodiments other than the preferred forms specifically set out and described above. Accordingly, it is intended by the appended claims to cover all modifications of the invention that fall within the true spirit and scope of the invention.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A removable cargo liner for selectively illuminating a vehicle rear cargo area comprising:
   a planar body portion having a surface area adapted to cover at least a portion of a cargo floor surface when removably positioned in the vehicle rear cargo area;
   a light element assembly for providing selective illumination, wherein the light element assembly being in a fixed relation with the planar body portion; and
   a photovoltaic cell circuit received by the planar body portion, wherein the photovoltaic cell circuit being oriented to receive light energy and to produce therefrom a photovoltaic charge signal, the photovoltaic cell circuit including:
      a charging circuit for charging a voltage source, the charging circuit coupled to the photovoltaic cell circuit and operable to receive the photovoltaic charge signal to produce a charge output; and
      a controller coupled to the charging circuit and to the light element assembly, wherein the controller being operable in a first mode for charging the voltage source and in a second mode for discharging the voltage source to the light element assembly.

2. The removable cargo liner of claim 1, wherein the photovoltaic cell circuit further comprising:
   a plurality of solar cells oriented to form a planar surface for receiving the light energy and being coupled to generate an additive voltage to produce the photovoltaic charge signal.

3. The removable cargo liner of claim 1, wherein the charging circuit further comprising:
   voltage regulator circuit; and
   over-voltage cut-off circuit.

4. The removable cargo liner of claim 1, wherein the light element assembly further comprising:
   an upper bezel component with an upper flange to receive an upper surface of the planar body portion;
   a lower bezel component with a lower flange to receive a lower surface of the planar body portion; and
   a light element receiver coupled to the controller, wherein the upper bezel component and the lower bezel component function to couple with each other through the planar body portion for encasing the light element receiver in the fixed relation to the planar body portion.

5. The removable cargo liner of claim 4, wherein the light element receiver operates to receive at least one of a LED light element, a RGB LED light element, a high intensity discharge light element, and an incandescent light element.

6. The removable cargo liner of claim 1, wherein the first mode and the second mode being based on a vehicle user input to the controller.

7. The removable cargo liner of claim 6, wherein the vehicle user input comprising at least one of:
   tactile input switch data;
   wireless input data; and
   near field communication input data.

8. A cargo liner having a compact configuration and an expanded configuration comprising:
   a planar body portion having a surface area adapted to cover at least a portion of a cargo floor surface of a vehicle rear cargo area;
   a plurality of light element assemblies for providing selective illumination, wherein each of the plurality of light element assemblies are in a spaced-apart, fixed relation with the planar body portion;
   a photovoltaic cell circuit received by the planar body portion, wherein the photovoltaic cell circuit being oriented to receive light energy and to produce therefrom a photovoltaic charge signal;
   a charging circuit for charging a voltage source, the charging circuit coupled to the photovoltaic cell circuit, and operable to receive the photovoltaic charge signal and to produce a charge output; and
   a controller coupled to the charging circuit and to the plurality of light element assemblies, wherein:
      when in the expanded configuration, the controller being operable in a first mode for charging the voltage source and in a second mode for discharging the voltage source to the plurality of light element assemblies; and
      when in the compact configuration, the controller being operable in an override mode to disregard vehicle user input.

9. The cargo liner of claim 8, wherein the photovoltaic cell circuit further comprising:

a plurality of solar cells oriented in a planar surface for receiving the light energy, wherein the plurality of solar cells being coupled to generate an additive voltage to produce the photovoltaic charge signal.

10. The cargo liner of claim 8, wherein the charging circuit further comprising:
voltage regulator circuit; and
over-voltage cut-off circuit.

11. The cargo liner of claim 8, wherein the each of the plurality of light element assemblies further comprising:
an upper bezel component with an upper flange to adapt to an upper surface of the planar body portion; and
a light element receiver coupled to the controller, wherein the upper bezel component and the lower bezel component function to couple with each other through the planar body portion for encasing the light element receiver in a fixed relation to the planar body portion.

12. The cargo liner of claim 11, wherein the light element receiver operates to receive at least one of a LED light element, a high intensity discharge element, and an incandescent light element.

13. The cargo liner of claim 8, wherein the first mode and the second mode is based on a vehicle user input to the controller.

14. The cargo liner of claim 13, wherein the vehicle user input comprising at least one of:
tactile input switch data;
wireless input data; and
near field communication input data.

15. A renewable-energy device for selectively illuminating a cargo liner comprising:
a photovoltaic cell circuit received by a body portion of the cargo liner, wherein the photovoltaic cell circuit operable to receive light energy and to produce therefrom a photovoltaic charge signal, the photovoltaic cell circuit including:
a plurality of solar cells operable to receive the light energy and produce the photovoltaic charge signal;
a charging circuit for charging a voltage source, the charging circuit coupled to the plurality of solar cells to receive the photovoltaic charge signal and to produce a charge output; and
a controller coupled to the charging circuit and to the light a light element assembly, wherein the controller being operable in a first mode for charging the voltage source and a second mode for discharging the voltage source to a light element assembly to provide illumination.

16. The renewable-energy device of claim 15, wherein the plurality of solar cells being oriented along a planar surface for receiving the light energy and coupled to generate an additive voltage to produce the photovoltaic charge signal.

17. The renewable-energy device of claim 15, wherein the light element assembly for providing selective illumination, wherein the light element assembly configured for a fixed relation with a body portion of the cargo liner.

18. The renewable-energy device of claim 17, wherein the light element assembly further comprising:
an upper bezel component with an upper flange to receive an upper surface of the body portion; and
a light element receiver coupled to the controller, wherein the upper bezel component functions to couple with the body portion for encasing the light element receiver in the fixed relation to the body portion.

19. The renewable-energy device of claim 18, wherein the light element receiver operates to receive at least one of a LED light element, a RGB LED light element, a high intensity discharge light element, and an incandescent light element.

20. The renewable-energy device of claim 15, wherein the first mode and the second mode being based on a user input to the controller.

* * * * *